(12) United States Patent
Cavenaghi

(10) Patent No.: US 11,460,644 B2
(45) Date of Patent: Oct. 4, 2022

(54) OPTICAL CONNECTOR ADAPTER ASSEMBLY

(71) Applicant: Prysmian S.p.A., Milan (IT)

(72) Inventor: Luca Cavenaghi, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/154,068

(22) Filed: Jan. 21, 2021

(65) Prior Publication Data

US 2021/0231881 A1 Jul. 29, 2021

(30) Foreign Application Priority Data

Jan. 27, 2020 (IT) .......................... 102020000001519

(51) Int. Cl.
*G02B 6/26* (2006.01)
*G02B 6/38* (2006.01)

(52) U.S. Cl.
CPC ......... *G02B 6/3825* (2013.01); *G02B 6/3893* (2013.01); *G02B 6/3897* (2013.01)

(58) Field of Classification Search
CPC .. G02B 6/3825; G02B 6/3893; G02B 6/3897; G02B 6/3885; G02B 6/389; G02B 6/38; G02B 6/4439; G02B 6/26
See application file for complete search history.

(56) References Cited

U.S. PATENT DOCUMENTS

| 7,244,066 B2 * | 7/2007 | Theuerkorn ......... G02B 6/3878 |
| | | 385/53 |
| 9,091,832 B2 * | 7/2015 | Griffiths ............... G02B 6/4465 |
| 9,397,441 B2 | 7/2016 | Sun et al. |
| 10,197,740 B2 | 2/2019 | Takano et al. |
| 2010/0215322 A1 | 8/2010 | Matsumoto et al. |
| 2010/0266242 A1* | 10/2010 | Lu ........................ G02B 6/3877 |
| | | 385/53 |

* cited by examiner

*Primary Examiner* — Jennifer Doan
(74) *Attorney, Agent, or Firm* — Slater Matsil, LLP

(57) ABSTRACT

An optical connector adapter assembly includes a first optical connector including a first optical connector body; an adapter body extending along a longitudinal direction between a first end and a second end, the adapter body defining a passing through channel extending along the longitudinal direction and configured to receive the first optical connector body at the first end and a second optical connector at the second end. The assembly includes a first locking arrangement to lock the first optical connector with respect to the adapter body along the longitudinal direction; the first locking arrangement including one or more locking elements associated with the adapter body and extending inside the passing through channel along the longitudinal direction towards the first end; a locking portion associated with the first optical connector body and configured to engage with the locking elements; and a retaining element arranged outside the first optical connector body.

21 Claims, 10 Drawing Sheets

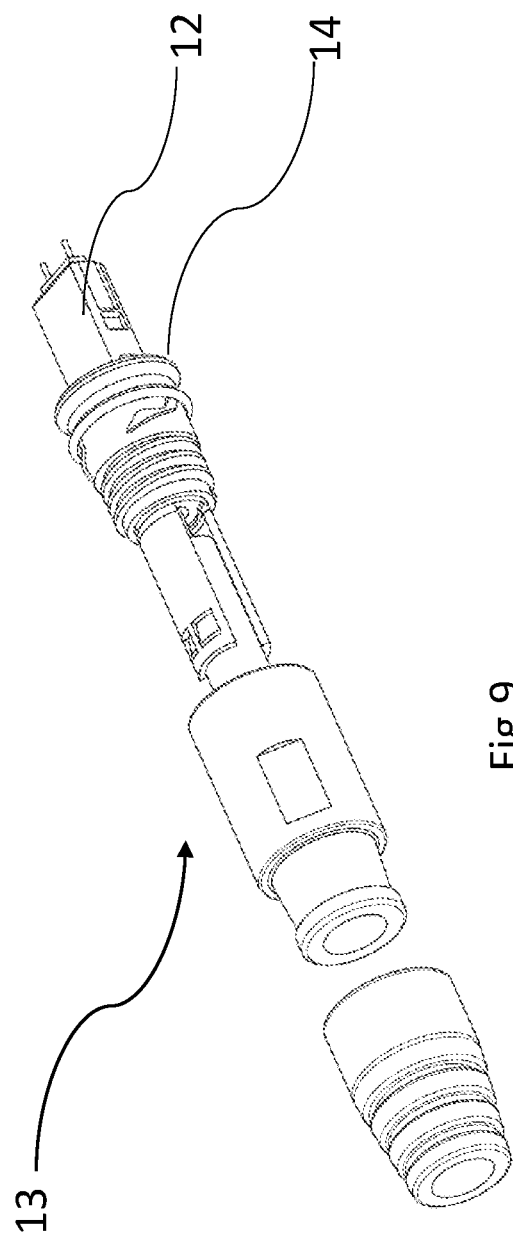
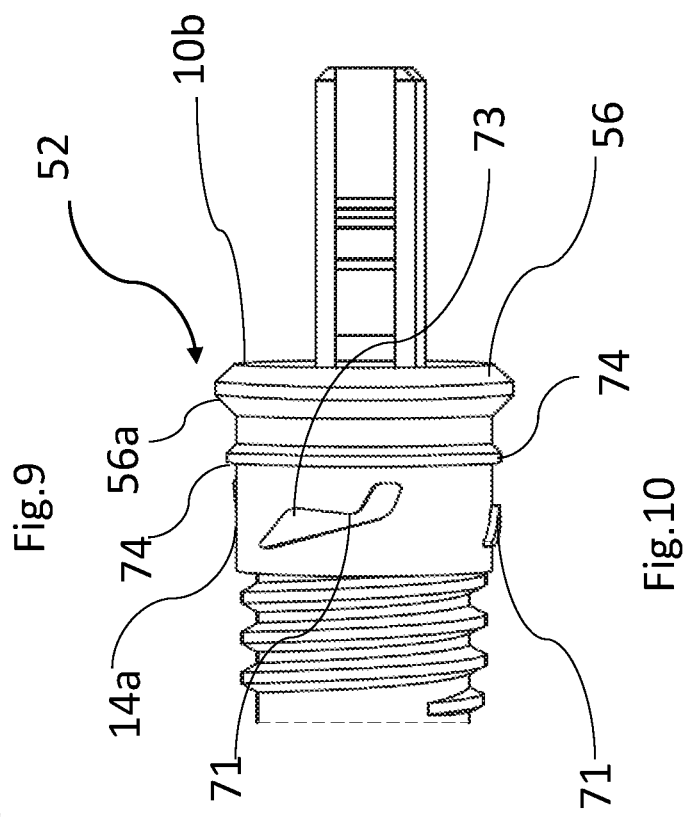
Fig.9
Fig.10

OPTICAL CONNECTOR ADAPTER ASSEMBLY

CROSS-REFERENCE TO RELATED APPLICATIONS

This application claims the benefit of Italian Patent Application No. 102020000001519 filed on Jan. 27, 2020, which application is hereby incorporated herein by reference.

TECHNICAL FIELD

The present invention relates to the field of equipment and components for the installation of optical cables to an optical (access) network, optical termination box or a distribution box.

BACKGROUND

Typically, optical cables are mutually connected by means of optical connectors which allow to properly transmit optical signals between optical cables. However, such optical connectors may have different sizes and shapes. It is known in the art to use adapters in order to correctly connect two different optical connectors.

Therefore, there is a demand to firmly and securely connect two optical connectors by means of an adapter in order to avoid disconnection and loss of signal.

U.S. Pat. No. 10,197,740 discloses reduced-profile connection components. The reduced-profile connection components are configured to connect various data transmission elements, including cables, network devices, and computing devices. A non-limiting example of a connection component includes a fiber optic connection component, including connectors, adapters, and assemblies formed therefrom. In some embodiments, the connection components may include mechanical transfer (MT) and multi-fiber push-on/pull-off (MPO) connection components, such as MT ferrules and MPO adapters.

The assembly disclosed in U.S. Pat. No. 10,197,740 does not provide a sufficient resistance to vibrations and therefore it does not provide a secure and firm engagement between the adapter boy and the optical connector.

SUMMARY

An optical connector adapter assembly for optical connectors comprises a first optical connector comprising a first optical connector body; an adapter body extending along a longitudinal direction between a first end and a second end, the adapter body defining a passing through channel extending along the longitudinal direction and configured to receive the first optical connector body at the first end and a second optical connector at the second end. The assembly comprises a first locking arrangement configured to lock the first optical connector with respect to the adapter body along the longitudinal direction. The first locking arrangement comprises one or more locking elements associated with the adapter body and extending inside the passing through channel along the longitudinal direction towards the first end, a locking portion associated with the first optical connector body and configured to engage with the locking elements, and a retaining element arranged outside the first optical connector body and slidably and rotatably mounted on the first optical connector body, the retaining element being configured to slide along the longitudinal direction to be positioned between the locking elements and the adapter body and to rotate with respect to the first optical connector body about the longitudinal direction to cooperate with the adapter body and the locking elements to mutually lock the first optical connector to the adapter body along and about the longitudinal direction.

BRIEF DESCRIPTION OF THE DRAWINGS

Further characteristics and advantages will become more apparent by reading the following detailed description of some embodiments given as examples with reference to the accompanying drawings, wherein:

FIG. 9 is an exploded view of an optical connector of FIG. 1;

FIG. 10 is a side view of a detail of the optical connector of FIG. 1;

DETAILED DESCRIPTION OF ILLUSTRATIVE EMBODIMENTS

Figure 1:
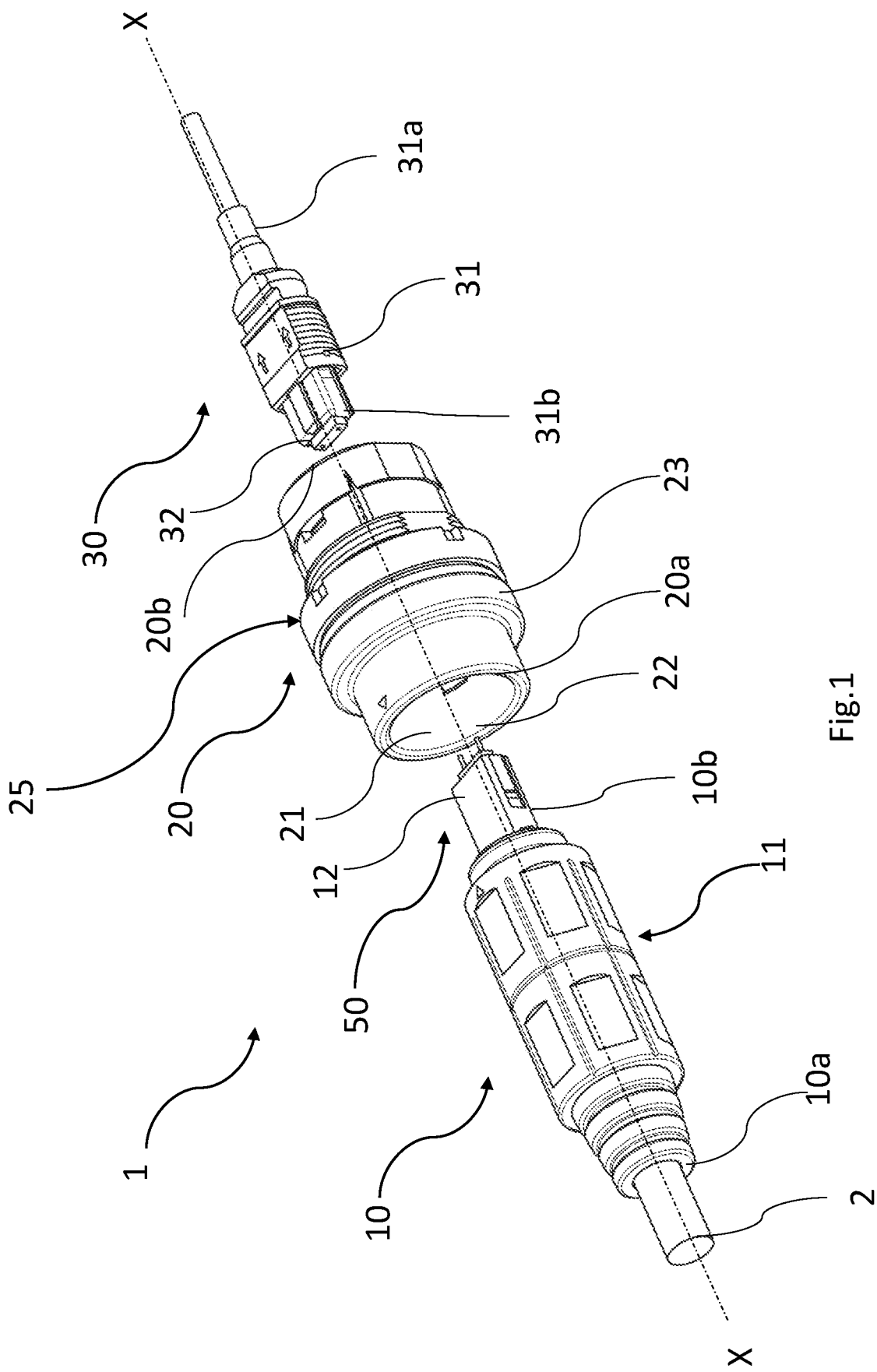
FIG. 1 is a perspective view of a disassembled optical connector adapter assembly according to one embodiment of the present invention.
Figure 2:
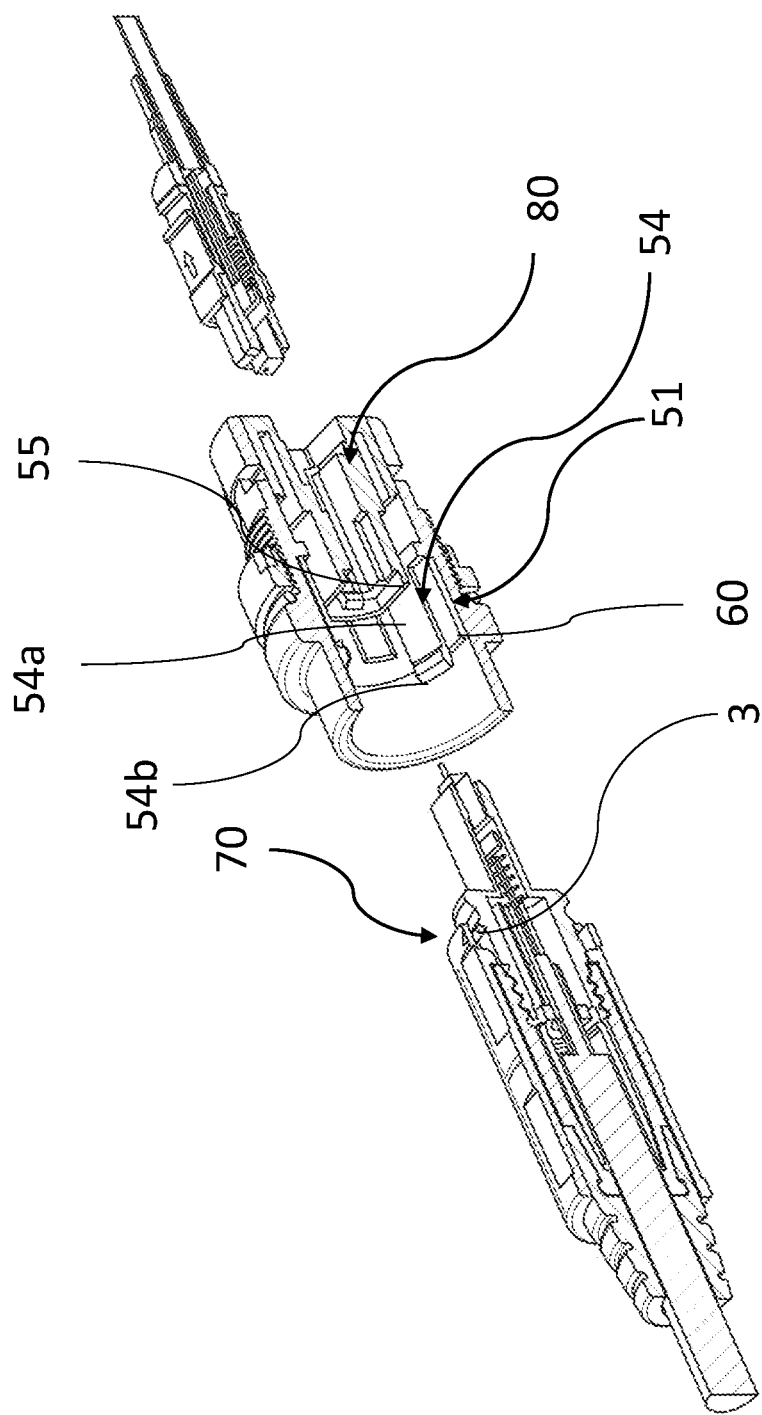
FIG. 2 is a side view of the optical connector adapter assembly of FIG. 1.

Embodiments of the present application provide an optical connector adapter assembly to secure and firmly retain optical connectors to an adapter body, avoiding vibration loose.

The Applicant has found that providing a locking arrangement which involves a cooperation of optical connector and adapter body facilitates the mutual lock of the elements, avoiding vibration loose and undesired disconnection.

Therefore, in various embodiments, the present invention relates to an optical connector adapter assembly for optical connectors comprising a first optical connector comprising a first optical connector body; an adapter body extending along a longitudinal direction between a first end and a second end, the adapter body defining a passing through channel extending along the longitudinal direction and configured to receive the first optical connector body at the first end and a second optical connector at the second end; a first locking arrangement configured to lock the first optical connector with respect to the adapter body along the longitudinal direction; wherein the first locking arrangement comprises one or more locking elements associated with the adapter body and extending inside the passing through channel along the longitudinal direction towards the first end; a locking portion associated with the first optical connector body and configured to engage with the locking elements and a retaining element arranged outside the first optical connector body and slidably and rotatably mounted on the first optical connector body, the retaining element being configured to slide along the longitudinal direction to be positioned between the locking elements and the adapter body and to rotate with respect to the first optical connector body about the longitudinal direction to cooperate with the adapter body and the locking elements to mutually lock the first optical connector to the adapter body along and about the longitudinal direction.

In an embodiment, when the retaining element is positioned between the locking elements and the adapter body, the retaining element cooperates by interference with an inner surface of the adapter body and the locking elements.

In an embodiment, the retaining element is configured to reversibly pass from a first position, where the retaining element is disengaged from the adapter body, to a second position, where the retaining element engages the locking elements.

In an embodiment, the retaining element is configured to rotate with respect to the first optical connector body to reversibly pass from the second position to a third position, where the retaining element is rotated.

In an embodiment, the locking elements are configured to elastically deform outwardly along a transversal direction transversal to the longitudinal direction, upon inserting the first optical connector in the adapter body.

In an embodiment, a seal is arranged between the adapter body and the locking elements, the seal being configured to limit outward elastic deformation of the locking elements, upon inserting the first optical connector in the adapter body.

In an embodiment, the retaining element is configured to abut against the seal when the retaining element is positioned between the locking elements and the adapter body.

In an embodiment, each locking element has a first portion spaced apart from an inner surface of the adapter body to allow the retaining element to be positioned between the inner surface of the adapter body and the locking elements, a second portion attached to the inner surface of the adapter body.

In an embodiment, the first portion is configured to elastically deform along the transversal direction upon inserting the first optical connector in the adapter body.

In an embodiment, the first portion comprises a tab attached to the second portion, a locking head projecting from the tab and configured to engage with the locking portion.

In an embodiment, the locking portion comprises a flange projecting outwardly from the first optical connector body along the transversal direction, the flange being configured to cooperate with the retaining element to retain therebetween the locking elements.

In an embodiment, the flange tapers from the first optical connector body along the transversal direction to guide the locking elements to position the locking elements between the flange and the adapter body upon inserting the first optical connector body into the passing through channel.

In an embodiment, the optical connector adapter assembly further comprising a second locking arrangement configured to longitudinally and rotationally attach the retaining element with respect to the adapter body and the first optical connector body, upon rotation of the retaining element around the longitudinal direction with respect the adapter body.

In an embodiment, the second locking arrangement comprises one or more retaining seats formed on the first optical connector body, one or more protrusions projecting from an inner surface of the retaining element and configured to engage respectively a respective retaining seat to longitudinally and rotationally retain the retaining element with respect the first optical connector body and the adapter body.

In an embodiment, the second locking arrangement comprises one or more guides, each guide defining a respective retaining seat.

Figures show an optical connector adapter assembly 1 for optical connectors 10, 30, able to securely connect different types of optical connectors.

As shown in the FIG. 1, the optical connector adapter assembly 1 comprises a first optical connector 10 and a second optical connector 30.

In the examples, the first optical connector 10 and the second optical connector 30 have different sizes. In particular, the first optical connector 10 is a robust connector assembly and the second optical connector 30 is an MPO connector.

The first optical connector 10 comprises a first optical connector body 11 extending along a longitudinal direction X-X between two end portions 10a, 10b. The second optical connector 30 comprises a second optical connector body 31 extending along the longitudinal direction X-X between two end portions 31a, 31b.

Both the first optical connector 10 and the second optical connector 30 are configured to retain an optical cable 2 at a respective end portion 10a, 31a. For the purposes of the present description, an optical cable comprises one or more optical fiber units, an outer sheath and, optionally, flexible strength members. A terminal connecting portion 12, 32 is provided at the respective opposite end portions 10b, 31b.

Preferably, as illustrated in FIG. 9, the first optical connector body 11 comprises a retaining member 13 configured to retain the optical cable 2 at the first end portion 10a and a connecting head 14 at the second end portion 10b. Preferably, the retaining member 13 and the connection head 14 are connected in a removable manner.

The terminal connection portion 12 projects along the longitudinal direction X-X from the connection head 14.

The optical connector adapter assembly 1 comprises an adapter body 20. The adapter body 20 allows to securely and firmly connect the first optical connector 10 to the second optical connector 30.

The adapter body 20 extends along the longitudinal direction X-X between a first end 20a and a second end 20b.

The adapter body 20 defines a passing through channel 21 extending along the longitudinal direction X-X and configured to receive the first optical connector body 11 at the first end 20a and the second optical connector 30 at the second end 20b. Specifically, the passing through channel 21 extends between a first opening and a second opening defined respectively at the first end 20a and at the second end 20b of the adapter body 20.

The adapter body 20 has an inner surface 22, facing the first optical connector 10 and the second optical connector 30 when they are arranged in the passing through channel 21, and an opposed outer surface 23.

Preferably, the adapter body 20 comprises a connecting portion 25 configured to connect the adapter body 20 with a box, such as a distribution box, or with an optical joint closure, or with a wall. The connection portion 25 is formed on the outer surface 23 of the adapter body 20 and, preferably comprises a threaded portion.

The adapter body 20 is configured to receive at least partially the first optical connector body 11 and the second optical connector body 31 in order to guarantee the mutual connection between the first optical connector 10 and the second optical connector 30.

Preferably, the adapter body 20 is configured to receive the connecting head 14 of the first optical connector 10.

The optical connector adapter assembly 1 comprises a first locking arrangement 50 configured to lock the first optical connector 10 with respect to the adapter body 20 along the longitudinal direction X-X.

Thanks to this first locking arrangement 50, the first optical connector body 10 is firmly attached to the adapter body 20 and assures a firm and reliable engagement between the first optical connector body 10 and the adapter body 20.

Preferably, the first locking arrangement 50 is arranged at the first end portion 20a of the adapter body 20 and at the second end portion 10b of the first optical connector body 10.

Preferably, the first locking arrangement 50 is configured to act on the portion of the first optical connector body 11 inserted in the passing through channel 21.

The first locking arrangement 50 comprises one or more locking elements 51, a locking portion 52 and a retaining element 53. The retaining elements 53 is configured to cooperate with the adapter body 20 to mutually lock the first optical connector 10 with respect to the adapter body 20 along the longitudinal direction X-X.

Preferably, the locking portion 52 and the locking elements 51 are configured to mutually engage and cooperate with the retaining element 53 and the adapter body 20 to lock the first optical connector 10 relative to adapter body 20.

More preferably, the retaining element 53 is configured to slide to be positioned between the locking elements 51 and the adapter body 20 to maintain the locking elements 51 engaged with the locking portion 52 and longitudinally lock the first optical connector 10 relative to adapter body 20. The retaining element 53 is slidably mounted on the first optical connector body 11.

According to one embodiment, the locking elements 51 are associated to the adapter body 20.

The locking elements 51 extend inside the passing through channel 21 along the longitudinal direction X-X, towards the first end 20a.

Preferably, the locking elements 51 are elastically deformable along a transversal direction Y-Y transversal to the longitudinal direction X-X. Thanks to this feature, the locking elements 51 are configured to flex along the transversal direction Y-Y, upon inserting the first optical connector 10 in the adapter body 20.

More preferably, the locking element 51 is configured to elastically deform outwardly along the transversal direction Y-Y, upon inserting the first optical connector 10 in the adapter body 20. Thanks to this arrangement, the locking element 51 is configured to elastically flex towards the inner surface 22 of the adapter body 20 upon inserting the first optical connector 10 in the adapter body 20.

For the purposes of the present invention, the term "outwardly" refers to a direction directed towards outside the assembly 1, while the term "inwardly" refers to an opposite direction.

According to one embodiment, the first locking arrangement 50 comprises at least two locking elements 51 mutually spaced apart. Preferably, the locking elements 51 are circumferentially spaced apart.

Each locking element 51 has a first portion 54 elastically flexible with respect the adapter body 20 and a second portion 55 attached to the adapter body 20.

Preferably, the first portion 54 is configured to elastically deform along the transversal direction Y-Y, upon inserting the first optical connector 11 in the adapter body 20, and to flex relative to the second portion 55.

More preferably, the first portion 54 is spaced apart from the inner surface 22 of the adapter body 20 defining a space between the inner surface 22 and the locking element 51. This space allows the transversal movement the locking element 51.

Furthermore, the space between the first portion 54 and the inner surface 22 allows the retaining element 53 to be positioned between the inner surface 22 of the adapter body 20 and the locking elements 51.

Thanks to the space between the first portion 54 and the inner surface 22, the retaining element 53 is insertable at least partially at the first end 20a in order to longitudinally lock the first optical connector 10 relative to the adapter body 20. The second portion 55 is attached to the inner surface 22 of the adapter body 20 in order to allow the first portion 54 to flex.

According to one embodiment, the first portion 54 comprises a tab 54a attached to the second portion 55 and extending along the longitudinal direction X-X towards the first end 20a.

Preferably, the first portion 54 further comprises a locking head 54b projecting from the tab 54a and configured to engage with the locking portion 52.

Specifically, the tab 54 is configured to elastically flex encouraging, upon inserting the first optical connector 11 in the adapter body 20, the locking head 54b to engage with the locking portion 52 and, preferably, to step over the locking portion 52.

Thanks to the locking head 54b, the locking elements 51 improve the engagements with the locking portion 52.

According to one embodiment, a seal 60 is arranged between the adapter body 20 and the locking elements 51.

Preferably, the seal 60 is arranged in the space defined between the locking elements 51 and the inner surface 22. Specifically, the seal 60 is arranged between the first portion 54 and the inner surface 22 of the adapter body 20.

The seal 60 is configured to avoid water and/or pollution contamination of the assembly 1. Furthermore, the seal 60 is configured to limit the outward elastic deformation of the locking elements 51, upon inserting the first optical connector 10 in the adapter body 20.

Preferably, the seal 60 is configured to cooperate with the adapter body 20 to maintain the mutual engagement between the locking elements 51 and the locking portion 52.

More preferably, the retaining element 53 is configured to abut against the seal 60 when the retaining element 53 is positioned between the locking elements 51 and the adapter body 20.

Thanks to the interference between the locking elements 51, the seal 60 and the inner surface 22, it is possible to provide both a seal effect and retaining effect.

According to one embodiment, the locking portion 52 is formed on the first optical connector body 11 and is configured to engage with the locking elements 51.

Preferably, the locking portion 52 is formed on the connecting head 14 proximal to the second end portion 10b of the first optical connector 10. More preferably, the locking portion 52 is formed on an outer surface 14a of the connecting head 14.

The locking portion 52 comprises a flange 56 projecting outwardly from the first optical connector body 11 along the transversal direction Y-Y at the second end portion 10b.

Specifically, the flange 56 projects from the outer surface 14 of the connecting head 14 at the second end portion 10b.

Preferably, the flange 56 projects from the first optical connector body 11 along a direction, perpendicular to the longitudinal direction X-X which in the example, corresponds to the transversal direction Y-Y.

More preferably, the flange 56 extends continuously around the first optical connector body 11. In detail, the flange 56 annularly surrounds the connecting head 14.

The flange 56 is configured to cooperate with the retaining element 53 to retain therebetween the locking elements 51. In detail, the first portions 54 of the locking elements 51 are configured to engage the flange 56 before the retaining element 53 is positioned between the locking elements 51 and the adapter body 20.

According to one embodiment, the flange 56 defines an engaging surface 56a configured to engage with the locking elements 51. Specifically, each locking head 54b is configured to abut against the engaging surface 56a upon insertion of the first optical connector body 11 into the adapter body 20.

Preferably, the flange 56 tapers from the outer surface 14a of the first optical connector body 11 along the transversal direction Y-Y to guide the locking elements 51 to position the locking elements 51 between the flange 56 and the adapter body 20 upon inserting the first optical connector body 11 into the passing through channel 21.

It is to be noted that the flange 56 is tapered on both sides defining a ridge.

More preferably, the tapered flange 56 facilitates a gradual deformation of the tab 54a when the locking head 54b abuts against the side of the flange 56 facing the second end portion 10b and the side of the flange 56 facing the first end portion 10a of the first optical connector 10. In detail the tapered flange 56 facilitates an outwardly deformation of the tab 54a when the locking head 54b abuts against the side of the flange 56 facing the second end portion 10b and an inwardly deformation after the locking head 54a step over the flange 56 to engage the side of the flange 56 facing the first end portion 10a of the first optical connector 10.

Thanks to the tapered sides of the flange 56, the first optical connector body 11 can be easily inserted in the passing through channel 21 facilitating the installation operations.

According to one embodiment, the retaining element 53 is arranged outside the first optical connector body 11 and is configured to slide along the longitudinal direction X-X.

The retaining element 53 is configured to be positioned between the locking elements 51 and the adapter body 20 to cooperate with the adapter body 20 and the locking elements 51 to mutually lock the first optical connector 10 to the adapter body 20 along the longitudinal direction X-X.

Preferably, the retaining element 53 cooperates by interference with an inner surface 22 of the adapter body 20 and the locking elements 51, when the retaining element 53 is positioned between the locking elements 51 and the adapter body 20.

More preferably, the retaining element 53 comprises an interposition portion 58 configured to be positioned between the locking elements 51 and the adapter body 20.

According to one embodiment, the retaining element 53 comprises a sleeve surroundings at least partially the first optical connector body 11.

The retaining element 53, positioned between the locking elements 51 and the inner surface 22, maintains the locking elements 51 engaged with the locking portion 52.

Preferably, upon insertion of the first optical connector body 11 in the adapter body 20, the retaining element 53 positioned between the locking elements 51 and the inner surface 22 avoids the locking head 54b to disengage the locking portion 52 stepping over the flange 56.

According to one embodiment, the retaining element 53 is configured to reversibly pass from a first position, where the retaining element 53 is disengaged from the adapter body 20, to a second position, where the retaining element 53 engages the locking elements 51.

Figure 3:
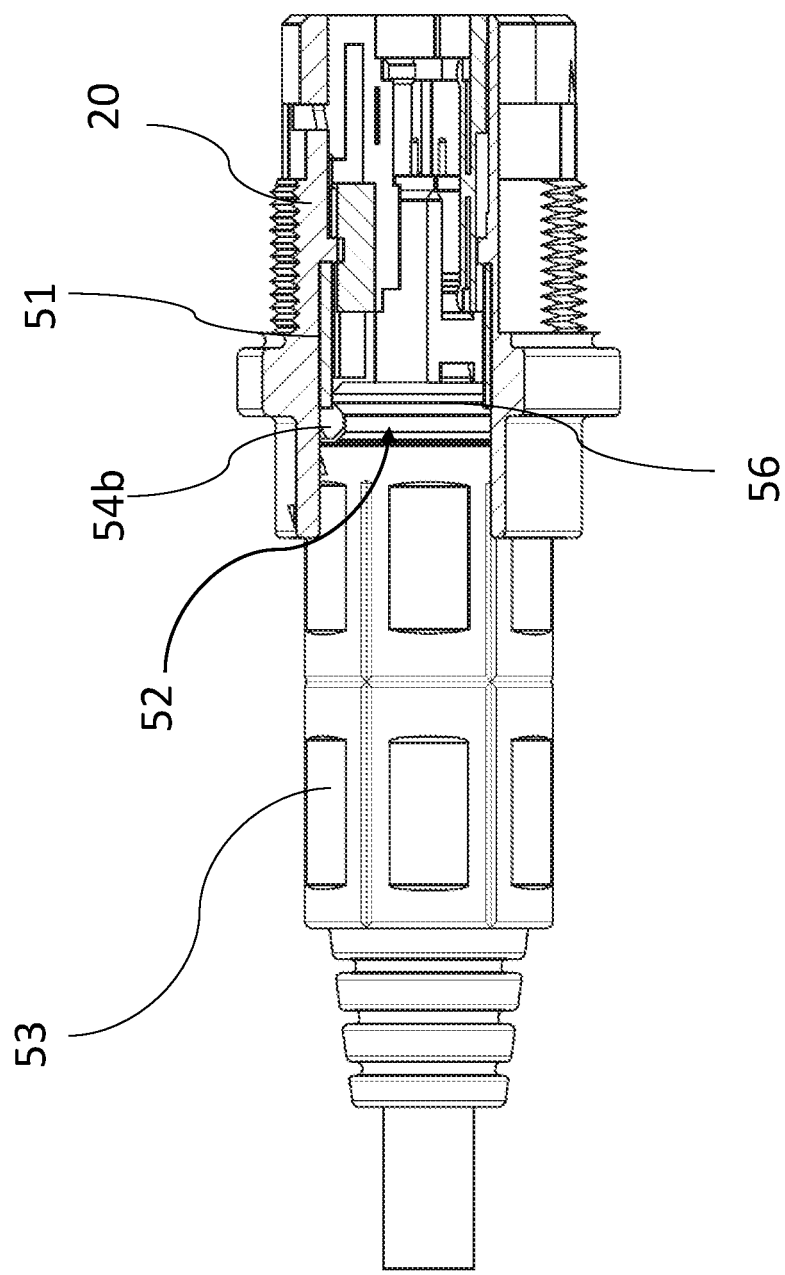
FIG. 3 is a partial section side view of the assembled optical connector adapter assembly according to one embodiment of the present invention.

Specifically, the passage from the first position to the second position and vice versa, corresponds to a slide of the retaining element 53 along the longitudinal direction X-X (FIG. 3).

Figure 4:
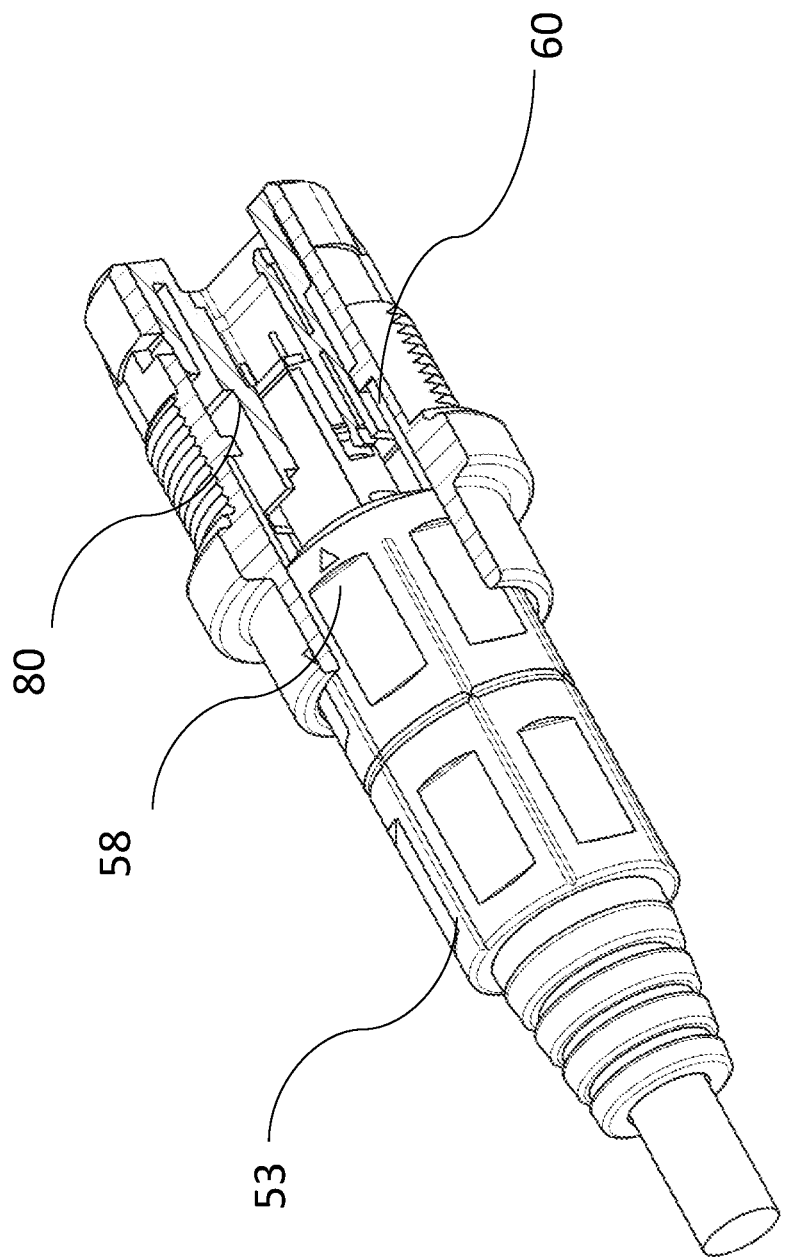
FIG. 4 is a partial section perspective view of the optical connector adapter assembly of FIG. 3.
Figure 5:
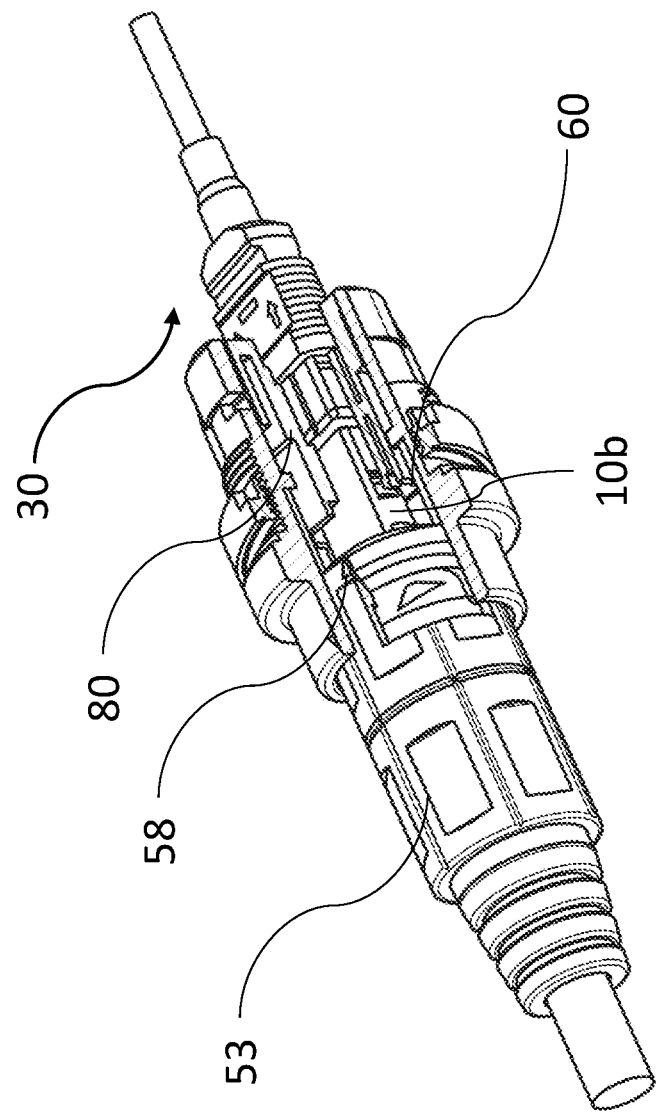
FIG. 5 is a partial section perspective view of the assembled optical connector adapter assembly according to one embodiment of the present invention with the retaining element in the second position.
Figure 6:
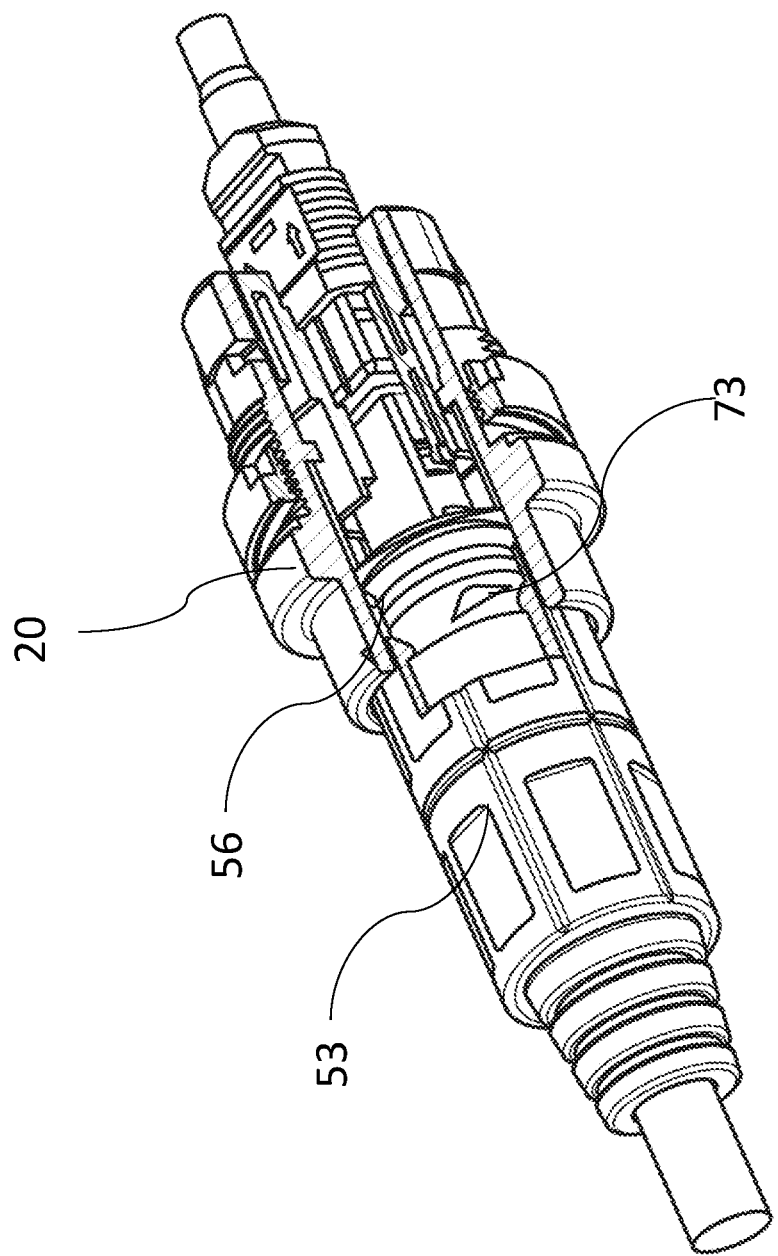
FIG. 6 is a partial section perspective view of the assembled optical connector adapter assembly of FIG. 5.
Figure 7:
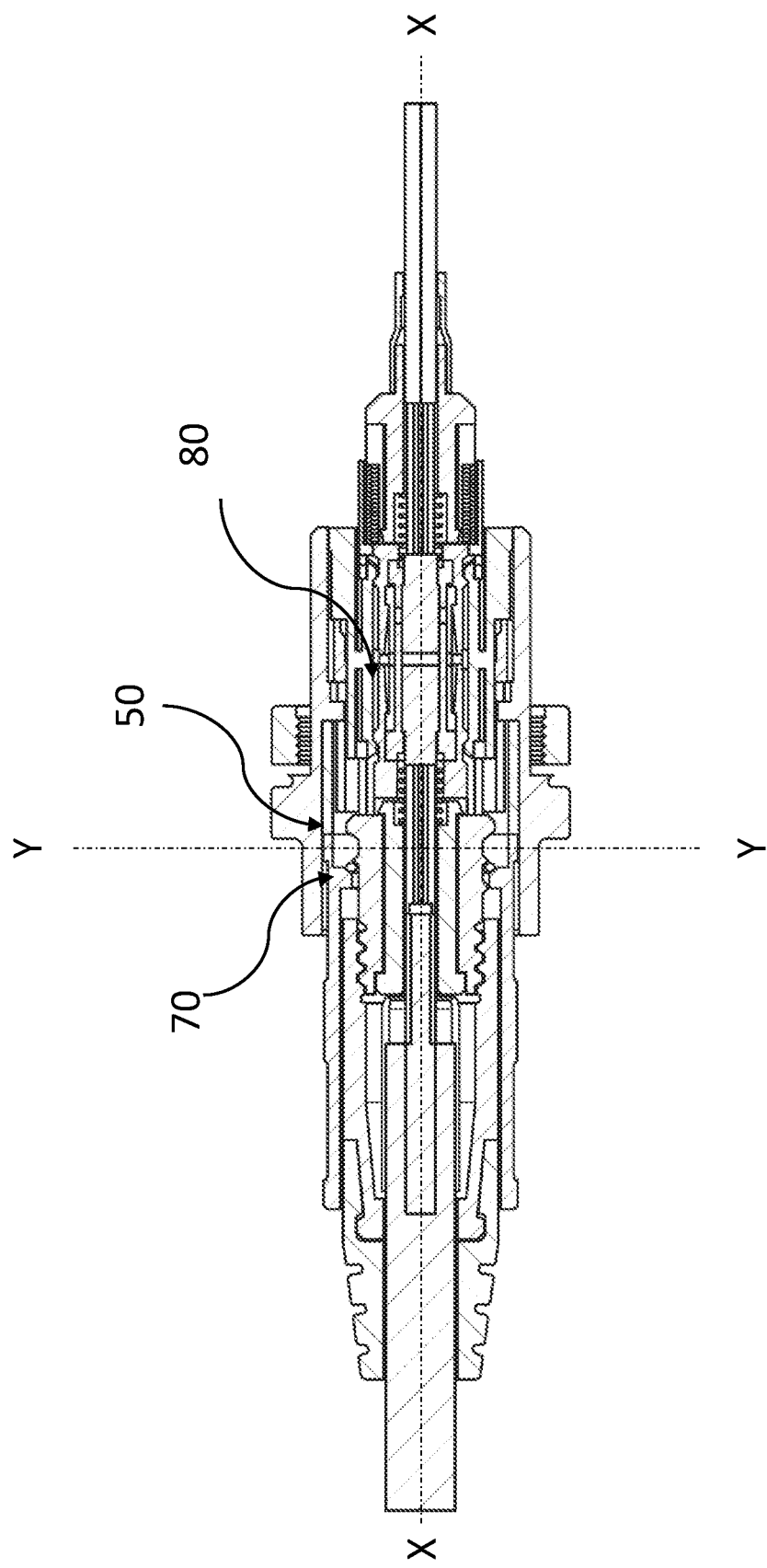
FIG. 7 is a section side view of the assembled optical connector adapter assembly of FIG. 5.
Figure 8:
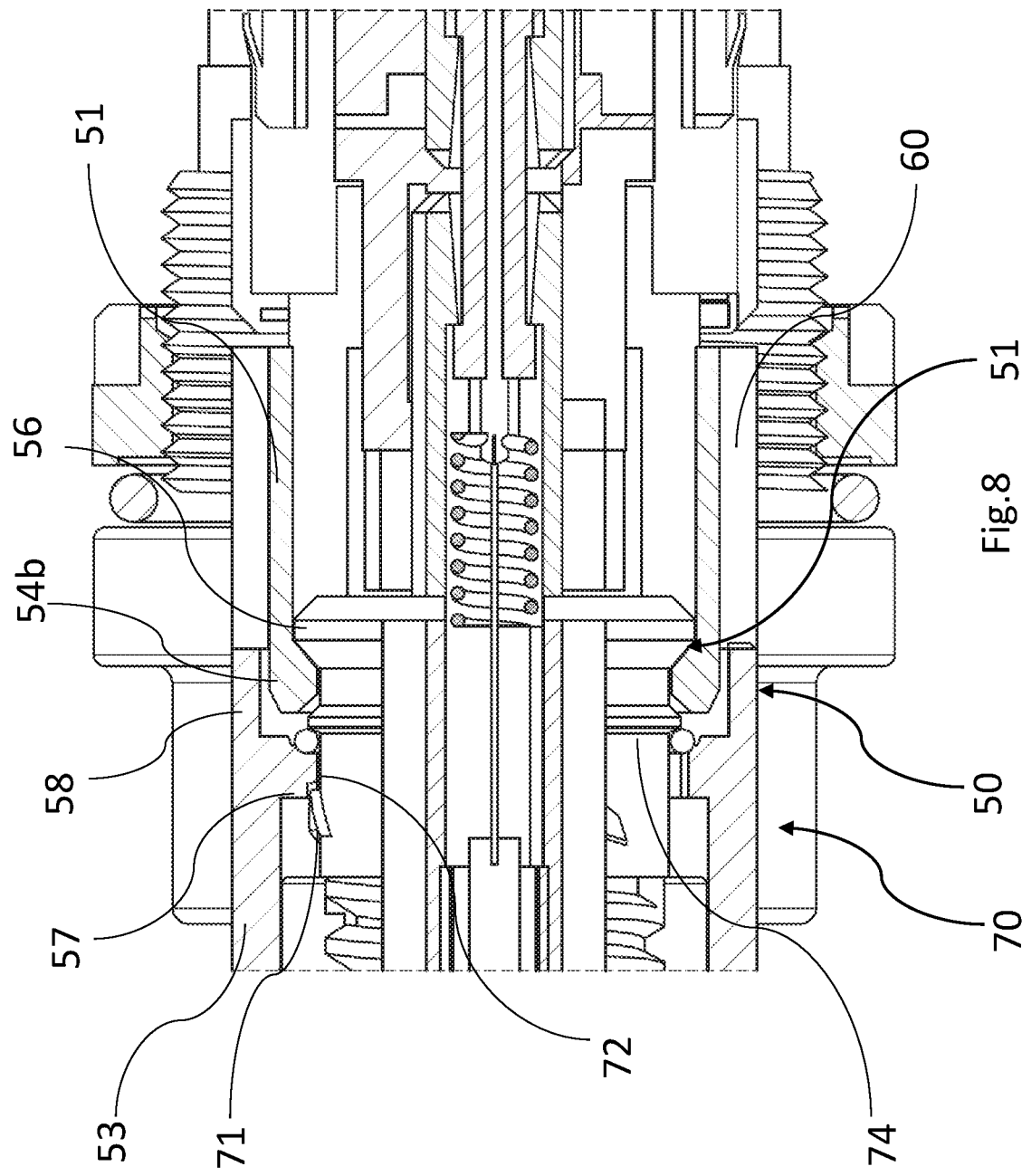
FIG. 8 is a detail of the assembled optical connector adapter assembly of FIG. 7.
Figure 11:
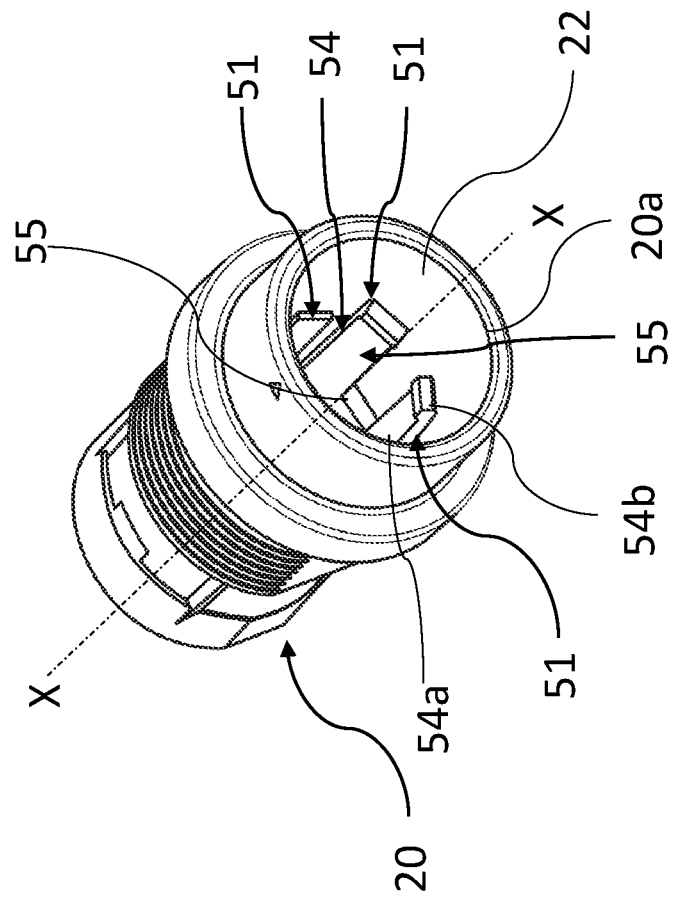
FIG. 11 is a perspective view of an adapter body of FIG. 1.
Figure 12:
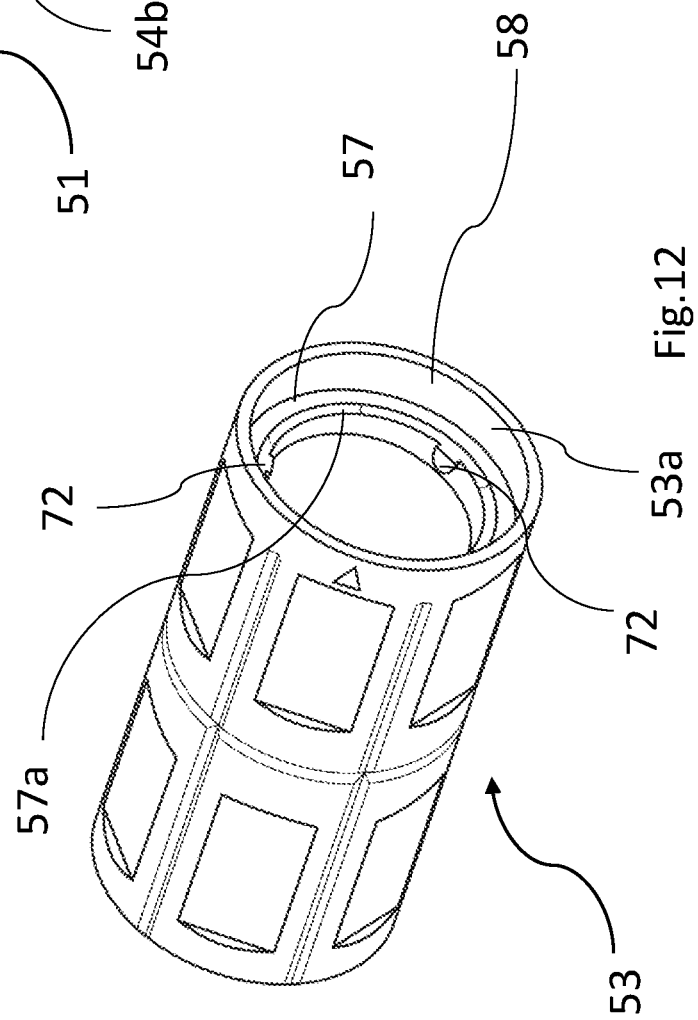
FIG. 12 is a perspective view of a retaining element of FIG. 1.

Furthermore, the retaining element 53 is rotatably mounted on the first optical connector body 11 and is configured to rotate with respect to the first optical connector body 11 around an axis extending along the longitudinal direction X-X (FIG. 4-6). Namely, the retaining element 53 is rotatable about the longitudinal direction X-X.

According one embodiment, the retaining element 53 is slidably and rotatably mounted on the first optical connector body 11 in order to cooperate with the adapter body 20 and the locking elements 51 to mutually lock the first optical connector 10 to the adapter body 20 along and about the longitudinal direction X-X. Indeed, the retaining element 53 is configured both to slide along the longitudinal direction X-X and to rotate with respect to the first optical connector body 11 about the longitudinal direction X-X.

The retaining element 53 is configured to reversibly pass from the second position to a third position, where the retaining element 53 is rotated.

According to one embodiment, the optical connector adapter assembly 1 further comprises a second locking arrangement 70 configured to longitudinally and rotationally attach the retaining element 53 to the adapter body 20 and the first optical connector body 11, upon rotation of the retaining element 53 around the longitudinal direction X-X with respect the adapter body 20.

The retaining element 53 passing from the second position to the third position longitudinally locks the first optical connector 10 to the adapter body avoiding the locking elements 51 to be disengaged from the locking portion 52.

The second locking arrangement 70 comprises one or more retaining seats 71 formed on the first optical connector body 11, downstream along the longitudinal direction X-X with respect to the flange 56 toward the first end portion 10a.

Preferably, the seats 71 are formed on the connecting head 14 projecting from the outer surface 14a.

More preferably, the seats 71 are spaced apart along outer surface 14a of the connecting head 14

The second locking arrangement 70 further comprises an annular protrusion 74 formed on the first optical connector body 11 and defining an abutment surface 74a configured to stop a longitudinal motion of the retaining element 53 along the longitudinal direction X-X.

Preferably, the annular protrusion 74 is formed between the flange 56 and the seats 71. Specifically, the annular protrusion 74 is formed on the connecting head 14 projecting from the outer surface 14a.

The second locking arrangement 70 comprises one or more protrusions 72 projecting from an inner surface 53a of the retaining element 53 and configured to engage a respective retaining seat 71 to longitudinally and rotationally retain the retaining element 53 with respect the first optical connector body 11 and the adapter body 20.

Preferably, the retaining element 53 comprises an inner flange 57 inwardly projecting from the inner surface 53a of the retaining element 53. In details, the protrusions 72 are formed on the inner flange 57

The inner flange 57 is configured to cooperate with the seats 71, the annular protrusion 74 and the protrusions 72 of the retaining element 53 to longitudinally and rotationally lock the retaining element 53 relative to the first optical connector body 11 and to the adapter body 20.

The second locking arrangement 70 further comprises one or more guides 73 which define a respective retaining seat 71. Specifically, each guide 73 engages a respective protrusion 72 upon passage of the retaining element 53 from the first position to the second position. Then, each guide 73 is configured to guide the engaged protrusion 72 to the respective retaining seat 71 upon the passage of the retaining element 53 from the second position to the third position.

According to one embodiment, the optical connector adapter assembly 1 comprises an annular seal 3 arranged between the annular protrusion 74 and the inner flange 57.

Preferably, the inner flange 57 comprise an annular groove 57a configured to accommodate the annular seal 3.

According to one embodiment, the optical connector adapter assembly 1 comprises an inner adapter 80 arranged at the second end 20b of the adapter body 20. Preferably, the inner adapter 80 is arranged in the passing through channel 21 at the second end 20b.

The inner adapter 80 is configured to attach the second optical connector 30 to the adapter body 20 and to connect the first optical connector 10 to the second optical connector 30.

The steps of mutual lock of the first optical connector 10 relative to the adapter body 20 are described hereinafter for explanatory purposes only.

Firstly, the second end portion 10b of the first optical connector 10 is inserted into the passing through channel 21 while the retaining element 53 is the first position. Following insertion of the first optical connector 10, the first locking elements 51 flex when the flange 56 abuts against the first locking elements 51, preferably against the locking head 54b. Once the first locking elements 51 step over the locking portion 52, the first locking elements 51 engage the locking portion 52 by means of the locking head 54b.

The retaining element 53 is then slid from the first position to the second position such that retaining element 53 is positioned between the locking element 51 and the adapter body 20. Specifically, the interposition portion 58 is positioned between the locking elements 51 and the adapter body 20. In the second position, the retaining element 53 engages the guides 73 by means of the protrusion 72 of the second locking arrangement 70.

Finally, the retaining element 53 is rotated from the second position to the third position in order to mutually lock the adapter body 20, the first optical connector body 10 and the retaining element 53. Upon rotation, the protrusions 72 engage the seats 71 longitudinally and rotationally lock the retaining element 53 relative to adapter body 20 and the first optical connector body 11. Then, the retaining element 53 longitudinally lock the adapter body 20 relative to the first optical connector body 11 retaining the locking element 51 engaged with the locking portion 52.

What is claimed is:

1. An optical connector adapter assembly for optical connectors comprising:

a first optical connector comprising a first optical connector body;

an adapter body extending along a longitudinal direction between a first end and a second end, the adapter body defining a passing through channel extending along the longitudinal direction and configured to receive the first optical connector body at the first end and a second optical connector at the second end; and a first locking arrangement configured to lock the first optical connector with respect to the adapter body along the longitudinal direction, the first locking arrangement comprising:

one or more locking elements associated with the adapter body and extending inside the passing through channel along the longitudinal direction towards the first end, a locking portion associated with the first optical connector body and configured to engage with the locking elements, and a retaining element arranged outside the first optical connector body and slidably and rotatably mounted on the first optical connector body, the retaining element being configured to slide along the longitudinal direction to be positioned between the locking elements and the adapter body and to rotate with respect to the first optical connector body about the longitudinal direction to cooperate with the adapter body and the locking elements to mutually lock the first optical connector to the adapter body along and about the longitudinal direction, wherein, when the retaining element is positioned between the locking elements and the adapter body, the retaining element cooperates by interference with an inner surface of the adapter body and the locking elements.

2. The optical connector adapter assembly according to claim 1, wherein the retaining element is configured to reversibly pass from a first position in which the retaining element is disengaged from the adapter body, to a second position in which the retaining element engages the locking elements.

3. The optical connector adapter assembly according to claim 2, wherein the retaining element is configured to rotate with respect to the first optical connector body to reversibly pass from the second position to a third position in which the retaining element is rotated.

4. The optical connector adapter assembly according to claim 1, wherein the locking elements are configured to elastically deform outwardly along a transversal direction transversal to the longitudinal direction, upon inserting the first optical connector in the adapter body.

5. The optical connector adapter assembly according to claim 4, wherein a seal is arranged between the adapter body and the locking elements, the seal being configured to limit outward elastic deformation of the locking elements, upon inserting the first optical connector in the adapter body.

6. The optical connector adapter assembly according to claim 5, wherein the retaining element is configured to abut against the seal when the retaining element is positioned between the locking elements and the adapter body.

7. The optical connector adapter assembly according to claim 1, wherein each of the one or more locking elements has:

a first portion spaced apart from an inner surface of the adapter body to allow the retaining element to be positioned between the inner surface of the adapter body and the locking elements, and a second portion attached to the inner surface of the adapter body.

8. The optical connector adapter assembly according to claim 7, wherein the first portion is configured to elastically deform along a transversal direction transversal to the longitudinal direction upon inserting the first optical connector in the adapter body.

9. The optical connector adapter assembly according to claim 7, wherein the first portion comprises:
a tab attached to the second portion; and
a locking head projecting from the tab and configured to engage with the locking portion.

10. An optical connector adapter assembly for optical connectors comprising:
a first optical connector comprising a first optical connector body;
an adapter body extending along a longitudinal direction between a first end and a second end, the adapter body defining a passing through channel extending along the longitudinal direction and configured to receive the first optical connector body at the first end and a second optical connector at the second end; and
a first locking arrangement configured to lock the first optical connector with respect to the adapter body along the longitudinal direction, the first locking arrangement comprising:
one or more locking elements associated with the adapter body and extending inside the passing through channel along the longitudinal direction towards the first end,
a locking portion associated with the first optical connector body and configured to engage with the locking elements, and
a retaining element arranged outside the first optical connector body and slidably and rotatably mounted on the first optical connector body, the retaining element being configured to slide along the longitudinal direction to be positioned between the locking elements and the adapter body and to rotate with respect to the first optical connector body about the longitudinal direction to cooperate with the adapter body and the locking elements to mutually lock the first optical connector to the adapter body along and about the longitudinal direction, wherein the locking portion comprises a flange projecting outwardly from the first optical connector body along a transversal direction transversal to the longitudinal direction, the flange being configured to cooperate with the retaining element to retain therebetween the locking elements.

11. The optical connector adapter assembly according to claim 10, wherein the flange tapers from the first optical connector body along the transversal direction to guide the locking elements to position the locking elements between the flange and the adapter body upon inserting the first optical connector body into the passing through channel.

12. The optical connector adapter assembly according to claim 10, further comprising a second locking arrangement configured to longitudinally and rotationally attach the retaining element with respect to the adapter body and the first optical connector body, upon rotation of the retaining element around the longitudinal direction with respect the adapter body.

13. The optical connector adapter assembly according to claim 12, wherein the second locking arrangement comprises:

one or more retaining seats formed on the first optical connector body, and
one or more protrusions projecting from an inner surface of the retaining element and configured to engage respectively a respective retaining seat to longitudinally and rotationally retain the retaining element with respect the first optical connector body and the adapter body.

14. The optical connector adapter assembly according to claim 13, wherein the second locking arrangement comprises one or more guides, each guide defining a respective retaining seat.

15. An optical connector adapter assembly for optical connectors comprising:
a first optical connector comprising a first optical connector body;
an adapter body extending along a first direction between a first end and a second end;
a passing through channel disposed in the adapter body and configured to receive the first optical connector body at the first end and a second optical connector at the second end; and
a first locking arrangement configured to lock the first optical connector with respect to the adapter body along the first direction, the first locking arrangement comprising:
a locking element associated with the adapter body and extending inside the passing through channel along the first direction towards the first end,
a locking portion associated with the first optical connector body and configured to engage with the locking element, and
a retaining element arranged outside the first optical connector body and slidably and rotatably mounted on the first optical connector body, the retaining element being configured to slide along the first direction to be positioned between the locking element and the adapter body and to rotate with respect to the first optical connector body about the first direction to cooperate with the adapter body and the locking element to mutually lock the first optical connector to the adapter body along the first direction, wherein the locking elements comprises a first portion spaced apart from an inner surface of the adapter body to allow the retaining element to be positioned between the inner surface of the adapter body and the locking elements, and a second portion attached to the inner surface of the adapter body.

16. The optical connector adapter assembly according to claim 15, wherein the first portion comprises:
a tab attached to the second portion; and
a locking head projecting from the tab and configured to engage with the locking portion.

17. The optical connector adapter assembly according to claim 15, wherein the first portion is configured to elastically deform along a second direction perpendicular to the first direction upon inserting the first optical connector in the adapter body.

18. The optical connector adapter assembly according to claim 17, wherein the locking portion comprises a flange projecting outwardly from the first optical connector body along the second direction, the flange being configured to cooperate with the retaining element to retain therebetween the locking element.

19. The optical connector adapter assembly according to claim 1, further comprising a second locking arrangement configured to longitudinally and rotationally attach the retaining element with respect to the adapter body and the first optical connector body, upon rotation of the retaining element around the longitudinal direction with respect the adapter body.

20. The optical connector adapter assembly according to claim 19, wherein the second locking arrangement comprises:
   one or more retaining seats formed on the first optical connector body, and
   one or more protrusions projecting from an inner surface of the retaining element and configured to engage respectively a respective retaining seat to longitudinally and rotationally retain the retaining element with respect the first optical connector body and the adapter body.

21. The optical connector adapter assembly according to claim 20, wherein the second locking arrangement comprises one or more guides, each guide defining a respective retaining seat.

* * * * *